United States Patent
Cao et al.

(10) Patent No.: US 11,734,204 B2
(45) Date of Patent: Aug. 22, 2023

(54) ADAPTIVE PROCESSOR RESOURCE UTILIZATION

(71) Applicant: Intel Corporation, Santa Clara, CA (US)

(72) Inventors: Gang Cao, Shanghai (CN); James R. Harris, Chandler, AZ (US); Ziye Yang, Shanghai (CN); Vishal Verma, Chandler, AZ (US); Changpeng Liu, Shanghai (CN); Chong Han, Shanghai (CN); Benjamin Walker, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 16/825,538

(22) Filed: Mar. 20, 2020

(65) Prior Publication Data

US 2020/0218676 A1 Jul. 9, 2020

Related U.S. Application Data

(60) Provisional application No. 62/828,375, filed on Apr. 2, 2019.

(51) Int. Cl.
*G06F 13/16* (2006.01)
*G06F 9/50* (2006.01)

(52) U.S. Cl.
CPC ........ *G06F 13/1668* (2013.01); *G06F 9/5027* (2013.01)

(58) Field of Classification Search
CPC ............................ G06F 13/1668; G06F 9/5027
See application file for complete search history.

(56) References Cited

U.S. PATENT DOCUMENTS

2004/0006720 A1* 1/2004 Atkinson .............. G06F 1/3203
713/300
2008/0244588 A1* 10/2008 Leiserson ............. G06F 9/4881
718/102

(Continued)

FOREIGN PATENT DOCUMENTS

JP 2009110404 A * 5/2009 ......... G06F 9/45533

OTHER PUBLICATIONS

Translation of JP-2009110404-A (Year: 2009).*

(Continued)

*Primary Examiner* — Henry Tsai
*Assistant Examiner* — John B Roche
(74) *Attorney, Agent, or Firm* — Compass IP Law PC

(57) ABSTRACT

Examples herein relate to polling for input/output transactions of a network interface or a storage device, or any peripheral device. Some examples monitor clock cycles spent checking for a presence of input/output (I/O) events and processing I/O events and monitor clock cycles spent checking for presence of I/O events without completing an I/O event. Central processing unit (CPU) core utilization can be based on clock cycles spent checking for a presence of I/O events and processing I/O events and clock cycles spent checking for presence of I/O events without completion of an I/O event. For example, if core utilization is below a threshold, frequency of the core can be reduced for performing polling of I/O events. If core utilization is at or above the threshold, frequency of the core can be increased used to performing polling of I/O events.

18 Claims, 10 Drawing Sheets

(56) References Cited

U.S. PATENT DOCUMENTS

| | | | |
|---|---|---|---|
| 2010/0027426 A1* | 2/2010 | Nair | H04W 28/16 |
| | | | 370/254 |
| 2016/0191412 A1* | 6/2016 | Min | H04L 41/0826 |
| | | | 709/226 |
| 2017/0171096 A1* | 6/2017 | Bunte | H04L 47/822 |
| 2019/0041957 A1 | 2/2019 | Hunt et al. | |
| 2020/0293465 A1* | 9/2020 | Yang | H04L 49/70 |
| 2021/0389906 A1* | 12/2021 | Zinger | G06F 3/0611 |

OTHER PUBLICATIONS

Intel Corporation, "Intel® Ethernet Adaptive Virtual Function (AVF) Hardware Architecture Specification (HAS)", Networking Division, Revision: 1.0, Feb. 2018, 90 pages.

NVM Express, Inc., "NVM Express Base Specification" NVM Express, Revision 1.4, Jun. 10, 2019, 403 pages.

Stern, Jonathan, "Why SPDK?", https://spdk.io/update/2016/04/13/not-your-mothers-storage/, Apr. 13, 2016, 3 pages.

\* cited by examiner

ADAPTIVE PROCESSOR RESOURCE UTILIZATION

RELATED APPLICATION

The present application claims the benefit of a priority date of U.S. provisional patent application Ser. No. 62/828,375, filed Apr. 2, 2019, the entire disclosure of which is incorporated herein by reference.

BACKGROUND

With the emergence of the non-volatile memory (NVM) Express (NVMe) protocol, the Input/Output Operations Per Second (IOPS) and latency of read and write I/Os on Peripheral Component Interconnect (PCI) express (PCIe) solid state devices (SSDs) has been greatly improved compared with Serial AT Attachment (SATA), Serial Attached SCSI (SAS) protocol, and so forth. To achieve high performance (e.g., higher throughput and lower latency), increased central processing unit (CPU) resources are needed for traditional kernel device drivers arising out of system calls, context switches and interrupt mechanisms. The CPU resource utilization from the kernel driver is noticeably higher with the evolution of even faster PCIe SSDs.

DETAILED DESCRIPTION

Intel Storage Performance Development Kit (SPDK) is designed and developed to allow the performance of NVMe SSDs with less CPU cores to achieve higher throughput and lower latency using a kernel driver. NVMe is described at least in NVM Express™ Base Specification Revision 1.4 (2019), and derivatives and revisions thereof. In a polled mode, a program can continually poll devices to determine if work is available to perform. However, when applications run in a polled mode, a CPU is constantly running because the CPU is constantly looking for work to perform.

To free up CPU cycles, available solutions include lockless, user space, core affinity, and asynchronous polling. These techniques can free the CPU from complex software logic. For asynchronous polling, software sends a batch of I/O requests in an asynchronous manner and actively polls NVMe SSDs for the status of completions instead of relying on the SSDs to interrupt the CPU to indicate completion. This can help reduce CPU load on storage applications which exhibit: (1) high throughput, (2) average latency, and (3) low tail latency (99% percent, 99.9% percent, or more).

An active polling mechanism through the user space can involve little kernel intervention and provide the device completion of requests in a fast manner.

Figure 1:
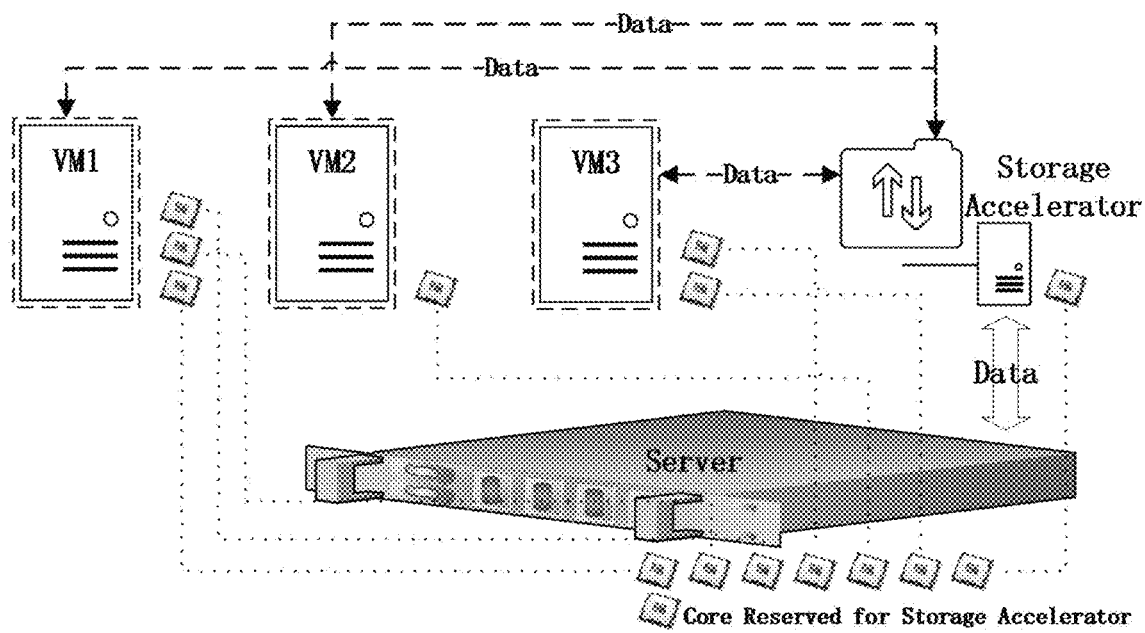
FIG. 1 depicts a VM deployment for a storage application.

Hyper-Converged Infrastructure (HCI) provides for many virtual machines (VMs) for compute and storage to be deployed on the same server. The storage accelerator serves I/O workloads from the VMs with a dedicated CPU resource. FIG. 1 depicts an example VM deployment for a storage application. VM1-VM3 are assigned CPU resources, with more CPU resources assigned for better I/O performance. The storage application can also be assigned to a specific CPU resource to support all VMs workloads. In this example, a very few number of CPU cores are reserved. As CPU resources are isolated for VMs and storage applications, the I/O performance obtained within the VM can be guaranteed. The more workloads from VMs, the more dedicated CPU resources are needed from the storage accelerator to operate the I/O devices.

With Storage Performance Development Kit (SPDK)-like user space storage solutions, assigned cores can be utilized to meet critical I/Os performance requests through actively polling completions of devices. There still is a concern that in the particular period within the day or within the month, lighter application workloads are active and the active polling may be not needed and CPU does not need to be 100% utilized for active polling.

For Cloud Service Providers (CSPs), the VMs on a single server could be defined with different levels of performance and a number of different performance levels can be changed based on external users of VMs at run time. In this case, adjusting the amount of CPU resources allocated for the polled-mode storage accelerator can be a challenge. If fewer cores are assigned, the committed VM performance may not meet requirements at run time. If more VMs and applications are newly allocated, it is not acceptable to reboot the storage accelerator to allocate more CPU resources and pause the storage service. On the other hand, assigning more cores at the beginning can mean costly power consumption or increase total cost of ownership (TCO).

Scaling CPU resources based on the real user workloads from the VMs/applications at run time for this kind of polled-mode storage accelerator can be challenging. There is a need to dynamically assign sufficient CPU resource at run time for better power consumption and also meet all levels of VMs/applications' performance requirement.

An approach to scaling CPU resources includes switching between polling and interrupt mode. For a hybrid scheme of polling and interrupt, if the workload is expected to be lower, active polling can be changed to interrupt based notification of completion. Once interrupt based, the CPU resource can be freed if there is no completion at the moment. However, this hybrid scheme can involve significant software complexity and a reduced set of cases where CPU resource reduction can be realized. Systems may have many SSDs serving many VMs and all operations must switch to interrupt mode to realize any savings. There is also an inherent latency cost to switch out of interrupt mode.

A storage service with adjustable frequency is another possible solution for existing storage services to directly adjust the CPU frequency. If this frequency control approach is not polled-mode based, it does not assign the specific CPU cores, so a determination of what core's frequency to adjust can be a challenge. Kernel based storage services can be executed on any core. When an interrupt occurs in the kernel space and as mentioned, due to much software overhead from kernel-user context switch, interrupt, lock-based and so on, the outcome from the frequency adjustment can be unmanaged to change the frequency for a purpose.

Interrupt based notification involves the kernel module to notify the user space application. As the optimized high performance user space storage solution, one key optimization is to avoid the kernel interaction. So that in order to switch to the interrupt, there is a need for the software work on kernel module support, interrupt service routine, existing software logic for interrupt notification, determination of when to switch between polling and interrupt, and so on. After changing to interrupt mode, interrupt based notification relies on the kernel to get the device completion and notify the user space application. Software scheduling and context switch are used but introduce the unpredictable software overhead. This could make the tail latency unpredictable and latency sensitive I/O applications could hit some issues if the response time is exceeding its timeout threshold.

Without a user space polled-mode storage accelerator, it can be challenging to determine an amount of storage service-related CPU resources and the extent of real I/O workloads spent by the CPU. If some performance gap is noticed for the applications or there is an opportunity to save some CPU resources, the control is out-of-bound and not inline and dynamically feedback-driven. Unmanaged performance can result which introduces difficulty for Cloud Service Providers to supply the VMs' services in accordance with service level agreements (SLAs).

Various embodiments dynamically adjust CPU or processor allocation for polling activities based on real workloads and respond to I/O requests in a sufficiently fast way through use of polling instead of hybrid scheme of polling and interrupt. Various embodiments provide an inline and feedback-driven method or framework to monitor the CPU usage on the real I/Os workloads and dynamically adjust the number of CPU cores and/or CPU frequency to fit the storage applications in a controllable and precise way to deliver manageable performance for VMs and I/O applications. Meanwhile, with lower CPU frequency, lower power consumption can be achieved but when heavy workloads arrive, the software Service Level Agreement (SLAs), especially the critical tail latency performance requirement to VMs and I/O applications, can be met. Tail latency can refer to a percentage of response times from a system, out of all of responses to the input/output (I/O) requests it serves, that take the longest in comparison to the bulk of its response times. Tail latency can refer to worst-case latencies seen at very low probability. Tail latency can also be measured from a cumulative probability distribution and it can have the lowest latency X such that latency>X occurs with probability no more than $10^{-15}$.

Various embodiments provide an inline and feedback-driven solution for a user space SPDK storage accelerator which is actively polling. Various embodiments monitor the actual I/O workloads from the applications in real time and adjust the number of assigned CPU cores and/or specific core's frequency adaptively and dynamically. For example, Intel Speed Select/Prioritize Base FREQ technology can be used to achieve desired storage performance and user friendly CPU usage.

Various embodiments provide the ability to dynamically adjust the CPU core frequency at runtime. A storage accelerator can use a polling mechanism to determine available work from devices like NVMe SSDs or other peripheral devices. CPU cores can be assigned at start of a storage application. But at runtime, there can be a decision to put some of these cores to sleep (or wake them back up). Threads (e.g., reactors) can move work being done by that core to another core. The number of CPU cores assigned to the storage accelerator can be changed at run time and the CPU frequency can be adjusted at run time based on workloads while high performance requirement to achieve requirements such as tail latency.

Note that reference to NVMe can also or alternatively apply to NVMe-oF compatible SSDs. NVMe-oF is described at least in NVM Express, Inc., "NVM Express Over Fabrics," Revision 1.0, Jun. 5, 2016, and variations and revisions thereof.

A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container may run the same in different environments. For example, a container that includes PHP and MySQL can run identically on both a Linux computer and a Windows® machine. Second, containers provide added security since the software may not affect the host operating system. While an installed application may alter system settings and modify resources, such as the Windows® registry, a container can only modify settings within the container.

Figure 2:
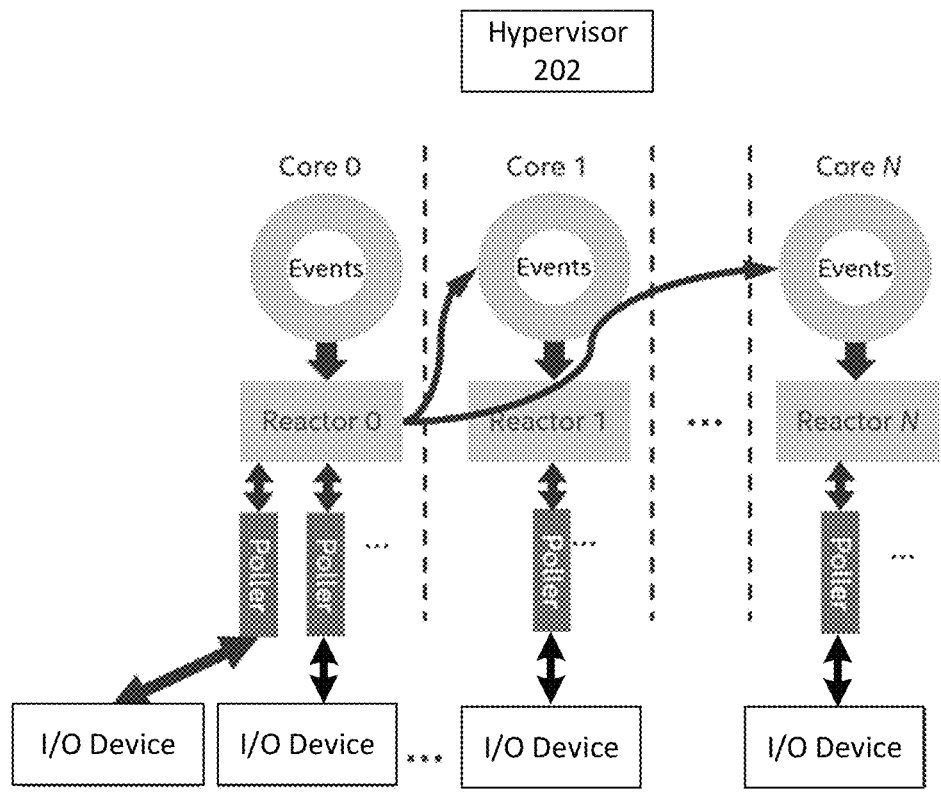
FIG. 2 depicts a key event framework with polling method for the high performance user space storage applications.

FIG. 2 depicts a key event framework with polling method at least for the user space storage applications (e.g., SPDK). A hypervisor 202 runs on a core and requests usage statistics of other reactors threads (e.g., reactor 0 to reactor N) and hypervisor 202 can decide whether to move work to another core or change its core frequency. Cores 0 to N can execute reactors 0 to N. In SPDK or other frameworks that perform poll mode programming, a reactor can be a thread that executes one or more pollers. In some examples, work activity of a reactor is based on work activity of executed pollers. For example, a poller can perform reading of a register or memory space to determine if a new I/O transaction is available to process. If a new I/O transaction is available to process, the poller can complete a descriptor for the I/O transaction and process new I/O transactions and then inform the I/O submitter (e.g., upper layer application) from VM of the completion status of the I/O transaction. A poller can process the I/O transaction by performing protocol handling, buffer management, or interact with the hardware device. Performing protocol handling can include extracting a command type of an NVMe command and preparing the I/O request from the Ethernet package. Buffer management can include preparing a buffer for NVMe SSD device and also the data buffer for packet receipt from an Ethernet NIC device. Interact with the storage or network device can include send I/O request to the NVMe SSD, the NVMe-oF remote device, or network device Work activity of a poller can be based on clock cycles spent by a poller to check for or service an I/O. If an I/O is not completed, then no work (FALSE) is indicated. If there is any I/O completion, the poller processes completions (completes descriptors) (and returns TRUE). For example, CPU cycles spent for checking or servicing I/Os with a TRUE (e.g., time stamp counter value from beginning of checking for I/O to return of TRUE) and CPU cycles spent for checking I/Os with FALSE (e.g., time stamp counter value from beginning of checking for I/O to return of FALSE) can be monitored. CPU utilization for I/O workloads can be determined from TRUE and FALSE. Work activity can be determined based on a ratio of (real I/O workloads can be represented as time stamp counter accruals for return of a TRUE)/(time stamp counter accruals for return of a TRUE+time stamp counter accruals for return of a FALSE).

Note that events can causes a reactor to send an event to one or more other cores using cross core messaging. Such cross core messaging can be factored into or not into determining work activity of a reactor. To accomplish cross-thread communication while minimizing synchronization overhead, the framework provides message passing in the form of events. The event framework runs one event loop thread per CPU core. These threads are called reactors and reactors can process incoming events from a queue. A reactor can use a lock-free queue for incoming events to its core, and threads from any core may insert events into the queue of any other core. A reactor loop running on a core can check for incoming events and executes them in first-in, first-out order as they are received.

Pollers, like events, are functions with arguments that can be bundled and executed. However, unlike events, pollers can be executed on the thread they are registered on repeatedly until unregistered. The reactor event loop intersperses calls to the pollers with other event processing. Pollers are intended to poll hardware as a replacement for interrupts. Pollers are executed on every iteration of the main event loop.

A high performance event framework can keep reactor and poller on a single core to check an incoming event and requests and the completion. CPU usage can be 100% on this core (that runs reactor and poller) to exchange between the storage applications and the I/O devices. In a heavy workload, the core can provide I/O devices' performance capability and respond to each I/O to attempt to meet the critical tail latency requirement.

Based on an event framework with polling and lockless design, various embodiments can provide a consistent I/O performance delivery (e.g., lower tail latency) and reduce CPU usage and power consumption through the inline and feedback-driven method to assign number of CPU cores at run time and/or adjust the CPU frequency.

NVMe-oF provides a poller for NVMe-oF I/Os as well to determine if I/O requests for NVMe-oF are received. Another poller can handle SSD I/Os and indicate complete storage transactions. NVMe SSDs can have many queues such that a core can have a dedicated queue pair (qpair) or qpairs for I/O. A qpair can include one submission queue (sq) and one completion queue (cq). A thread can manipulate one or multiple qpairs. Core0 uses queue-pair0 and its poller checks queue-pair0 to see if any I/Os completed that need to be processed.

Figure 3:
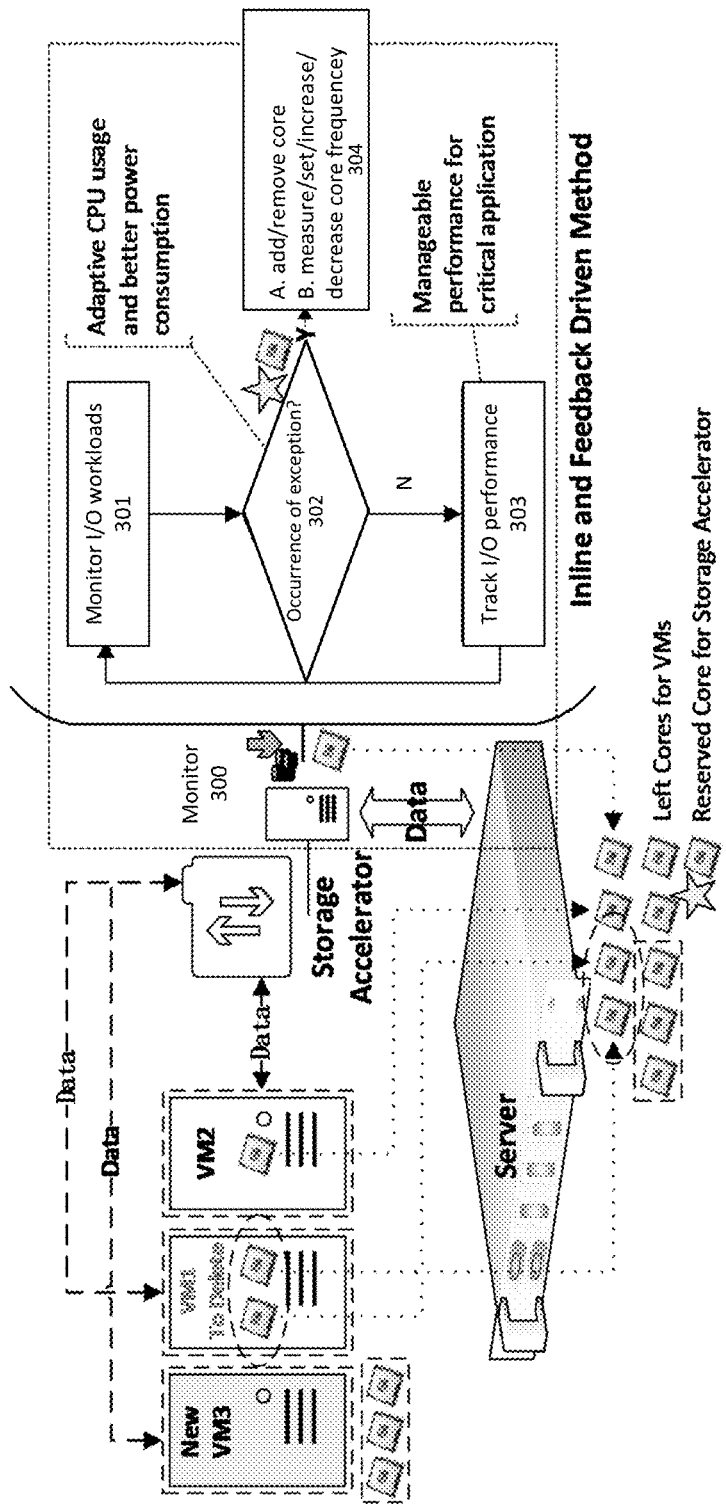
FIG. 3 depicts an example inline and feedback driven system for adapting CPU resources and managing I/O performance.

FIG. 3 depicts an example inline and feedback driven system for adapting CPU resources and managing I/O performance. Monitor 300 can add or remove resources used for polling and processing for new I/O transactions. Monitor 300 can be created to run from time to time for the inline and feedback driven method. Monitor 300 can perform one or more of: (a) monitor the real I/O workloads from the VMs/applications; (b) adjust the CPU resource based on the workloads; and (c) track the real I/O performance for the VMs/applications. The monitor can run within a core allocated for a storage accelerator to make the CPU resource management and application performance delivery in an adaptive and intelligent way without interrupt of VMs and applications. In some examples, monitor 300 can be implemented as a hypervisor.

A core can execute a monitor 300. Note in some cases, some cores can run nothing else but monitor 300. Monitor 300 can perform the process with actions 301 to 304. Action 301 can include monitor the real I/O workloads for VMs/applications at run time. If a poller checks to see if any I/Os completed. In some examples, if an I/O is completed, then a TRUE is indicated by monitor 300. However, if a poller checks to see if any I/Os completed but an I/O is not completed, then a FALSE is indicated by monitor 300. For example, monitor 300 can monitor CPU cycles spent for checking or servicing I/Os with a resulting TRUE (e.g., time stamp counter value from beginning of checking for I/O to return of TRUE) and CPU cycles spent for checking I/Os with a resulting FALSE (e.g., time stamp counter value from beginning of checking for I/O to return of FALSE). CPU utilization for real I/O workloads can be represented as a ratio of (time stamp counter accruals for return of a TRUE)/ (time stamp counter accruals for return of a TRUE+time stamp counter accruals for return of a FALSE). For a reactor that causes execution of one or more pollers, the CPU utilization can be a combination of CPU utilization of all of the one or more pollers.

Action 302 can include determining if an exception has occurred. For example, an exception can occur if CPU utilization for a reactor that causes execution of one or more pollers over period of time crosses a threshold or violate a service level agreement (SLA). If no exception occurs, then 303 follows 302. For example, if CPU utilization over period of time increases above a threshold or decreases below a second threshold, then an exception can occur and 304 can be performed. For example, at 304, where utilization over period of time increases above a threshold, monitor 300 can increase a clock frequency or cause a core to be added for use by reactor or poller(s). For example, at 304, if utilization over period of time decreases below a second threshold, then a clock frequency can be decreased or a core can be removed from use for a reactor or poller(s).

Action 304 can include managing the CPU resource at run time. This is a feature of this inline and feedback driven method or framework to deliver the manageable performance through active polling while adjusting CPU resource (e.g., number of cores used for polling and/or frequency of cores used for polling) dynamically. After determining the real I/O workloads and I/O performance, the CPU resource can be adjusted at run time. A frequency on a single core can be tuned to a number of levels (for example 10 levels) and each level can meet certain amount of I/O workloads along with the committed I/O performance. On the other hand, a CPU core could have a minimum required frequency for the least necessary operation, thus the CPU resource can be obtained through the formula $f(x, y)=xN+yM$: x is the number of cores and $x>=1$; y is the frequency level and $0<=y<=10$ (for example); N is the minimum required frequency and M is the single adjustable frequency interval for one core.

After determining the x and y based on the real I/O workloads and I/O performance, the CPU resource can be managed at run time to either add more cores and/or increase the frequency from the minimum required frequency or decrease the frequency to the minimum required frequency and/or remove existing core. A least a minimum required frequency and one core is used to allow the storage accelerator to operate. Other schemes for CPU resource calculation and the inline and feedback-driven method can be used to adjust the CPU resource at run time for the better CPU usage and committed I/O performance.

At 303, real I/O performance for a VM/application can be tracked. Monitor 300 can deliver manageable performance for an adaptive CPU resource. The committed performance to a storage application is an objective according to some embodiments. Monitor 300 can track the I/O request performance at run time. After it is known what the real CPU usage/utilization is based on the workloads, it is not enough as it can be unclear what the real or actual I/O performance is. For example, if the number of CPU cores and/or CPU frequency is adjusted (e.g., through Intel® Speed Select technology) to reduce the CPU usage, the workloads can be executed while the performance may drop unexpectedly. Adaptive CPU resource and performance management can track the I/O performance and especially the I/O latency that can occur. In the user space, SPDK storage accelerator, the I/O latency tracking can be enabled. SPDK can track IOPS and throughput to monitor I/O latency. Monitor and/or hypervisor can receive the performance information.

With light workloads, the storage application can achieve a same level of service quality for I/O latency and have no awareness of the backing user space polled-mode storage accelerator has changed the CPU usage. When any variation happens on the workloads of the storage application, by monitoring actual I/O performance and adjusting core utilization for a poller accordingly (e.g., increasing core frequency or number of allocated cores), less impact on the I/O latency can occur and more stable throughput can be maintained.

Figure 4:
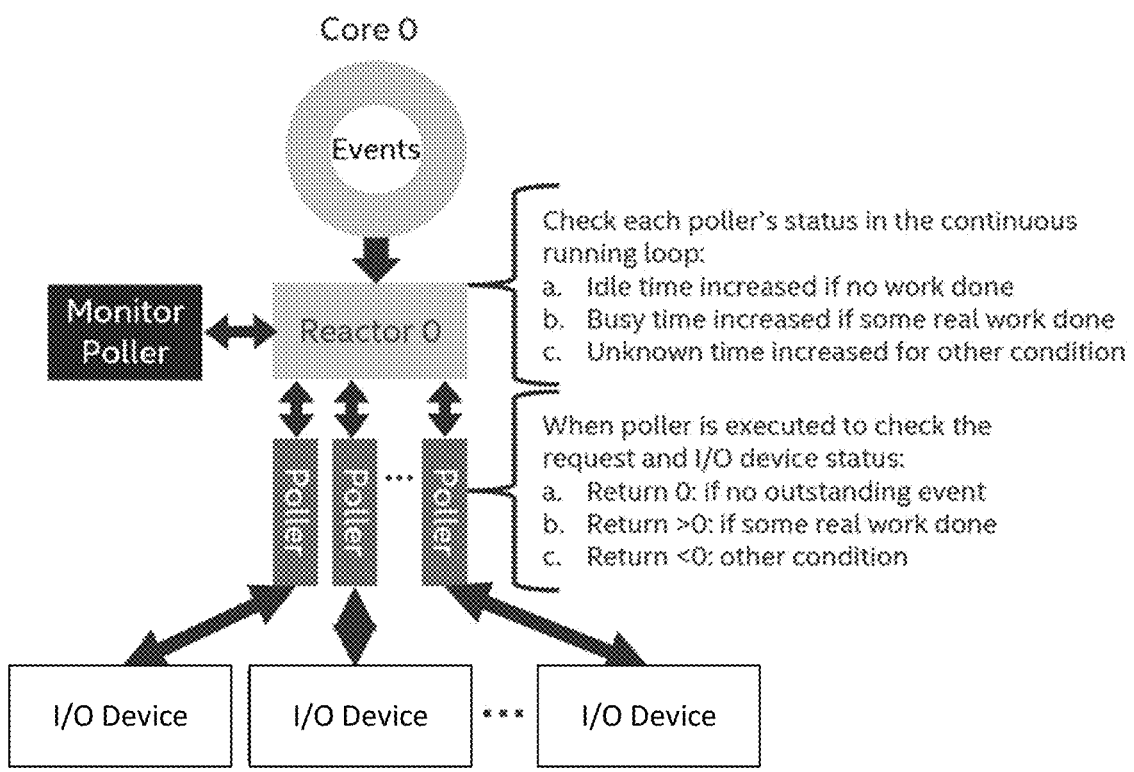
FIG. 4 shows some statistics gathering of a poller to check the I/O request and status of an I/O device to reflect the actual status instead of just executing the poller each time to consume the CPU resource.

FIG. 4 shows some statistics gathering of a monitor to check the I/O request and status of an I/O device to reflect the actual CPU usage. At the reactor level, three key performance metrics based on the poller execution status can be used: (1) idle time—no work is run on poller; (2) busy time—some real I/O work done; and (3) unknown time—other condition. Once these performance metrics are gathered, it is known how the CPU resource from the assigned core is distributed as real workloads or just idle. Furthermore, Intel® vTune functionalities can also be integrated with SPDK storage accelerator and the added poller may also obtain these statistics through vTune when vTune is properly setup and enabled. Return 0/1/<0 are from the poller and can be used to determine TRUE/FALSE status and clock cycles spent to arrive at TRUE or FALSE, as described earlier.

Figure 5:
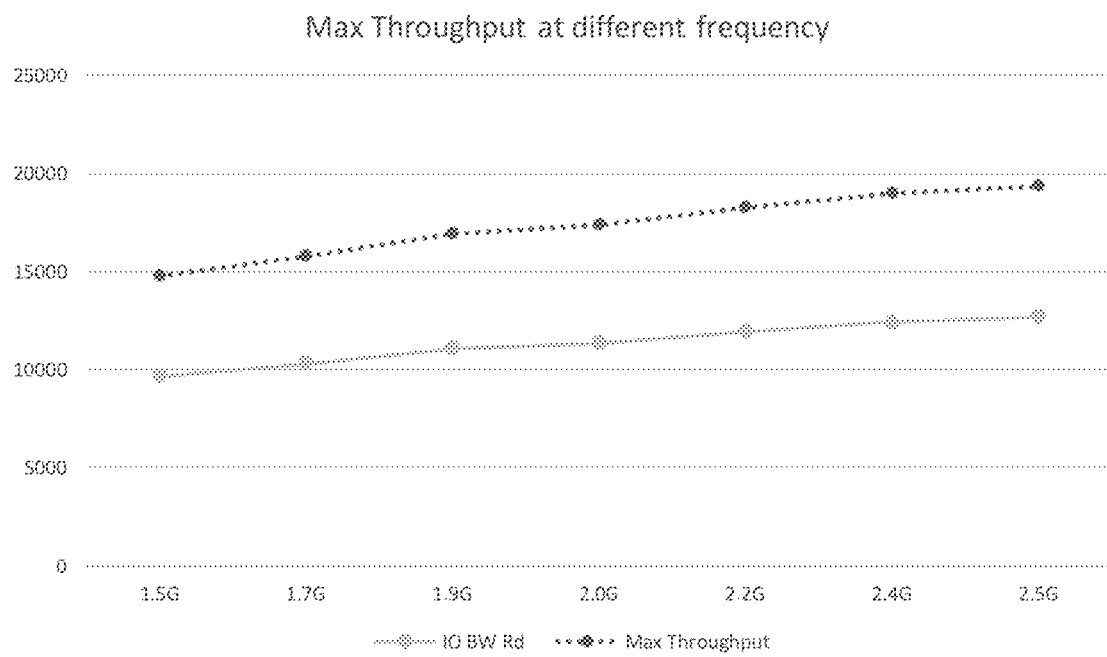
FIG. 5 depicts experimentation results for high performance user space polled-mode storage accelerator.

FIG. 5 depicts experimental results for high performance user space polled-mode (e.g., SPDK) storage accelerator where a CPU is mostly spent processing I/Os from the hardware. The throughput is almost linear with the CPU frequency. Thus, at a specific setting of CPU frequency and accumulated frequency from all assigned CPU cores, the expected throughput will be obtained to meet storage applications' needs. If real I/O workloads become heavy, more CPU cores can be added or increase the CPU frequency and vice versa to remove CPU cores or decrease the CPU frequency for a consistent performance. As long as the maximum throughput can be achieved, the tail latency performance merit can also be achieved for a single I/O.

Furthermore, a feature of this inline and feedback driven mechanism can be well extended for CPU intensive workloads like network I/Os (e.g., by a core that performs packet processing) which may also adopt the same polling technology as Data Plane Development Kit (DPDK). Any kinds of stressful I/O operations which requiring dedicated CPU resource and has a runtime requirement to properly assign the CPU resource (number of cores and core frequency) while delivering the manageable performance could be supported and covered by various embodiments. Embodiments can be used for any peripheral device such as an accelerator.

For example, allocation of resources for polling can be applied for packet processing. Packet processing activity can include processing of received packets such as one or more of: determination if a packet is valid (e.g., correct Ethernet type, correct checksum, correct IP Protocol type, valid layers 4-7 protocol type), determination of packet destination (e.g., next hop, destination queue), perform one or more of: IP filter checks, flow table lookup, access control lists (ACL), firewall, match-actions operations, outgoing port selection using a forwarding table, packet or data decryption, packet or data encryption, denial of server protection, packet counting, billing, traffic management/conditioning, traffic shaping/traffic scheduling, packet marking/remarking, packet inspection of layers 4-7, or traffic load balancing/load distribution. For example, packet processing process can apply Data Plane Development Kit (DPDK) or OpenDataPlane compatible processing. Service or function chaining can be applied where a packet is processed by multiple devices.

Packet processing can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Figure 6:
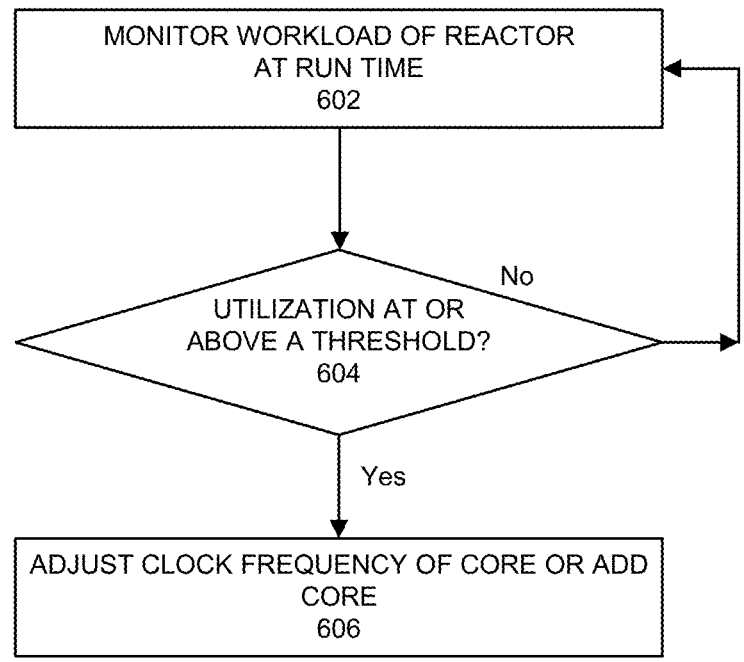
FIG. 6 depicts a process.

FIG. 6 depicts an example process to determine resources allocated to a reactor. At 602, workloads are monitored at run time. If a poller checks to see if any I/Os completed and I/O is completed, then a TRUE is indicated. However, if a poller checks to see if any I/Os completed but an I/O is not completed, then a FALSE is indicated. For example, CPU cycles spent for checking or servicing I/Os with a TRUE (e.g., time stamp counter value from beginning of checking for I/O to return of TRUE) and CPU cycles spent for checking I/Os with FALSE (e.g., time stamp counter value from beginning of checking for I/O to return of FALSE) can be monitored. Utilization can be determined from measurements of time stamp counters associated with returns of TRUE and FALSE. Utilization can be represented as (time stamp counter accruals for return of a TRUE)/(time stamp counter accruals for return of a TRUE+time stamp counter accruals for return of a FALSE). Utilization of some or all pollers launched by a reactor can be measured.

At 604, a determination can be made as to whether utilization meets or exceeds a threshold level. If a threshold of utilization is met or exceeded for a period of time, then 606 can follow. If the threshold of utilization is not met and not exceeded for a period of time, then 602 can follow 606.

At 606, a clock frequency of a core can be increased or decreased or a core can be added. For example, if utilization meets or exceeds a threshold of utilization for a period of time additional capacity is needed, and the frequency of the core (that runs the reactor and its poller(s)) can be increased or another core can be added or used to run the reactor and its poller(s). For example, if meeting or exceeding a threshold of utilization for a period of time indicates that too little work is available, then the core frequency can be decreased or fewer cores can be used for polling. Multiple thresholds can be used such that if utilization exceeds a first threshold for a period of time, the core allocation and/or core frequency can be increased for polling or if utilization is below a second threshold for a threshold period of time, the core allocation and/or core frequency can be reduced for polling.

A CPU core could have a minimum required frequency for the least necessary operation, thus the CPU resource can be obtained through the formula $f(x, y)=xN+yM$: x is the number of cores and $x>1$; y is the frequency level and $0<y<10$ (for example); N is the minimum required frequency and M is the single adjustable frequency interval for one core. After determining the x and y based on the real I/O workloads and I/O performance, the CPU resource will be managed at run time to either add more core and/or increase the frequency from the minimum required frequency or decrease the frequency to the minimum required frequency and/or remove existing core. A least minimum required frequency and one core is needed to make the storage accelerator work functionally.

Figure 7:
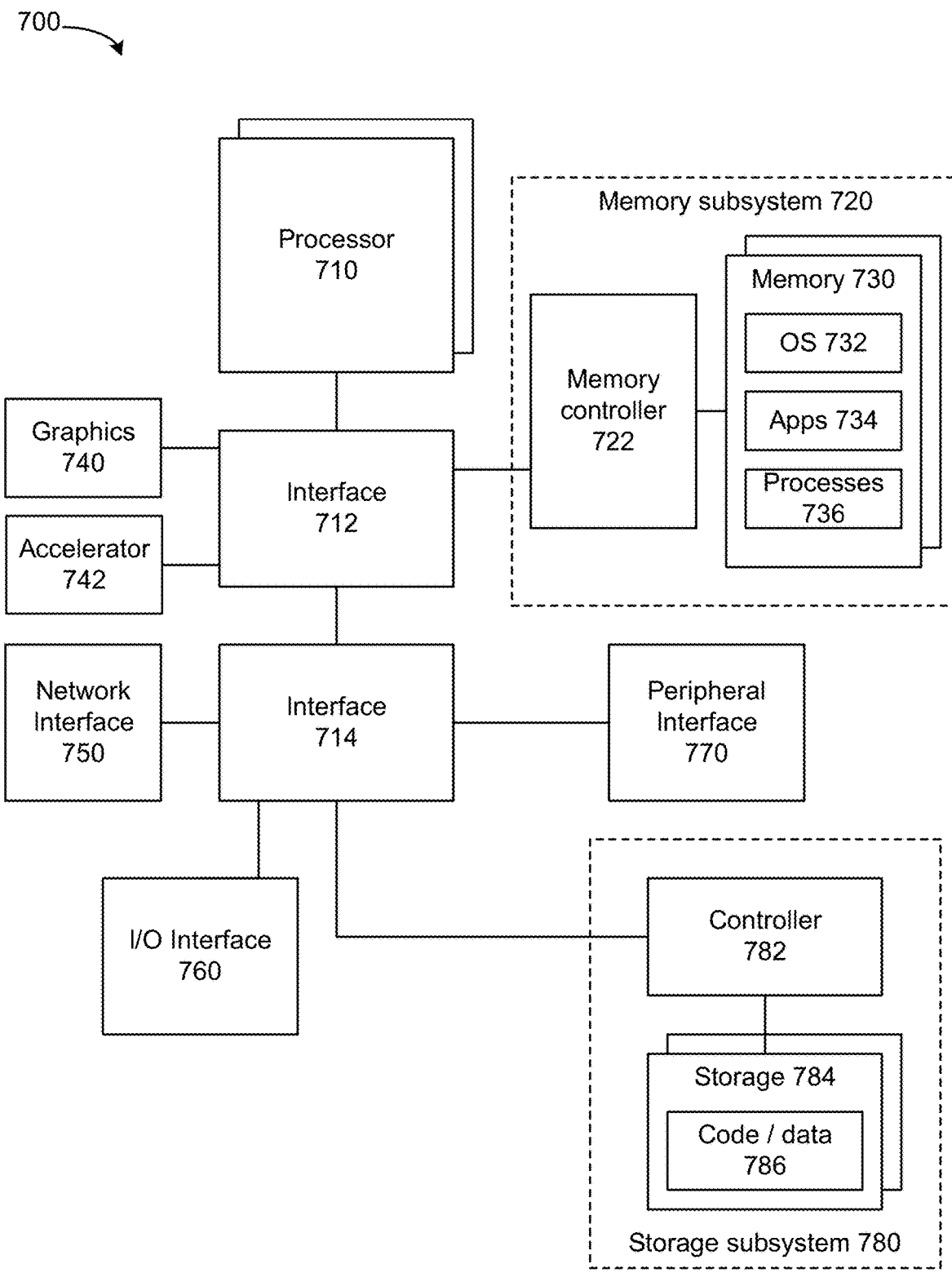
FIG. 7 depicts a system.

FIG. 7 depicts a system that can use embodiments herein to provide resource allocation to a reactor that executes one or more pollers. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a programmable or fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730 to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1374 bus.

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Figure 8:
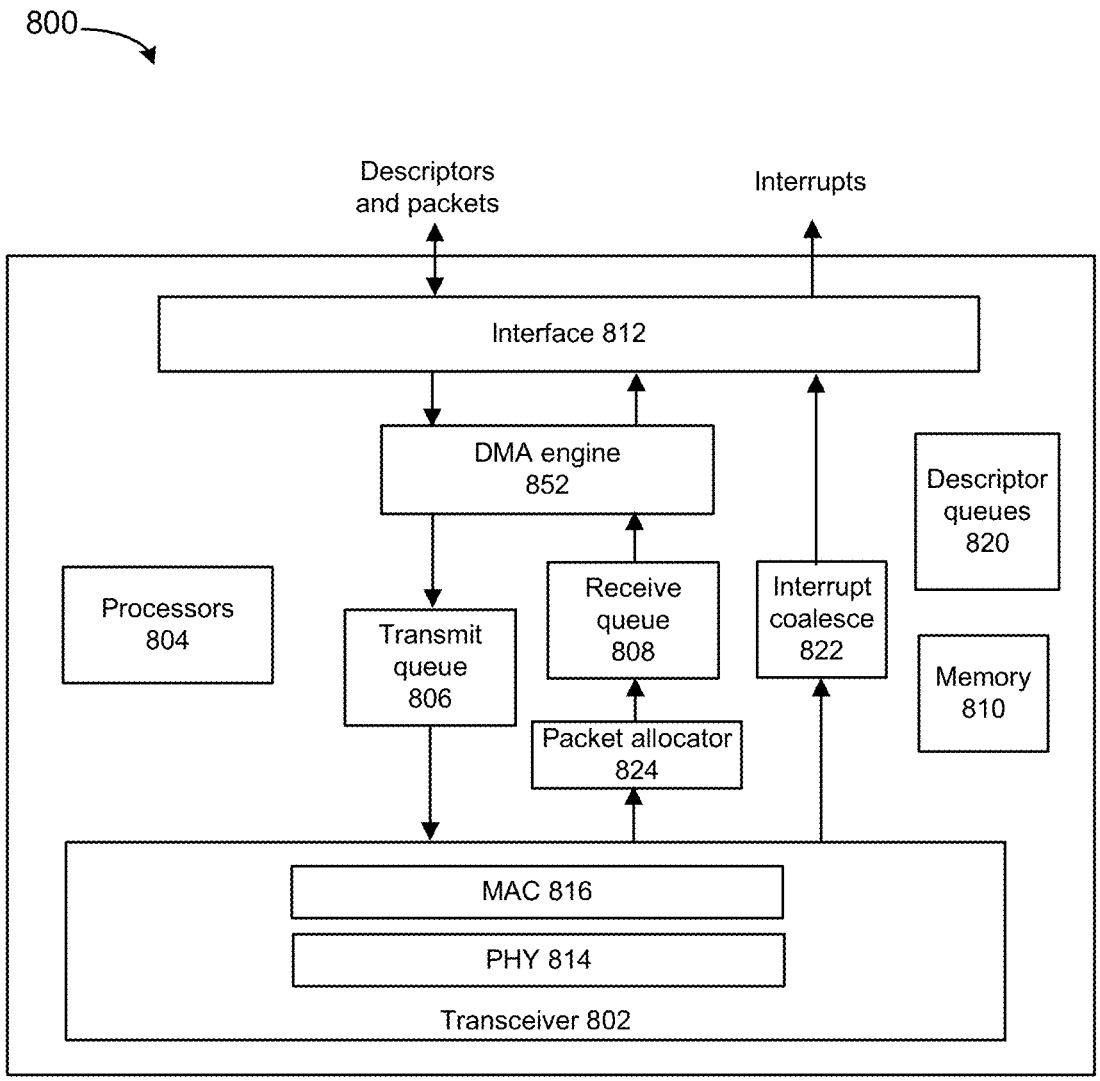
FIG. 8 depicts a network interface.

FIG. 8 depicts a network interface that can use embodiments or be used by embodiments. I/O event indications from the network interface can be monitored and processed by one or more pollers described herein. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 9:
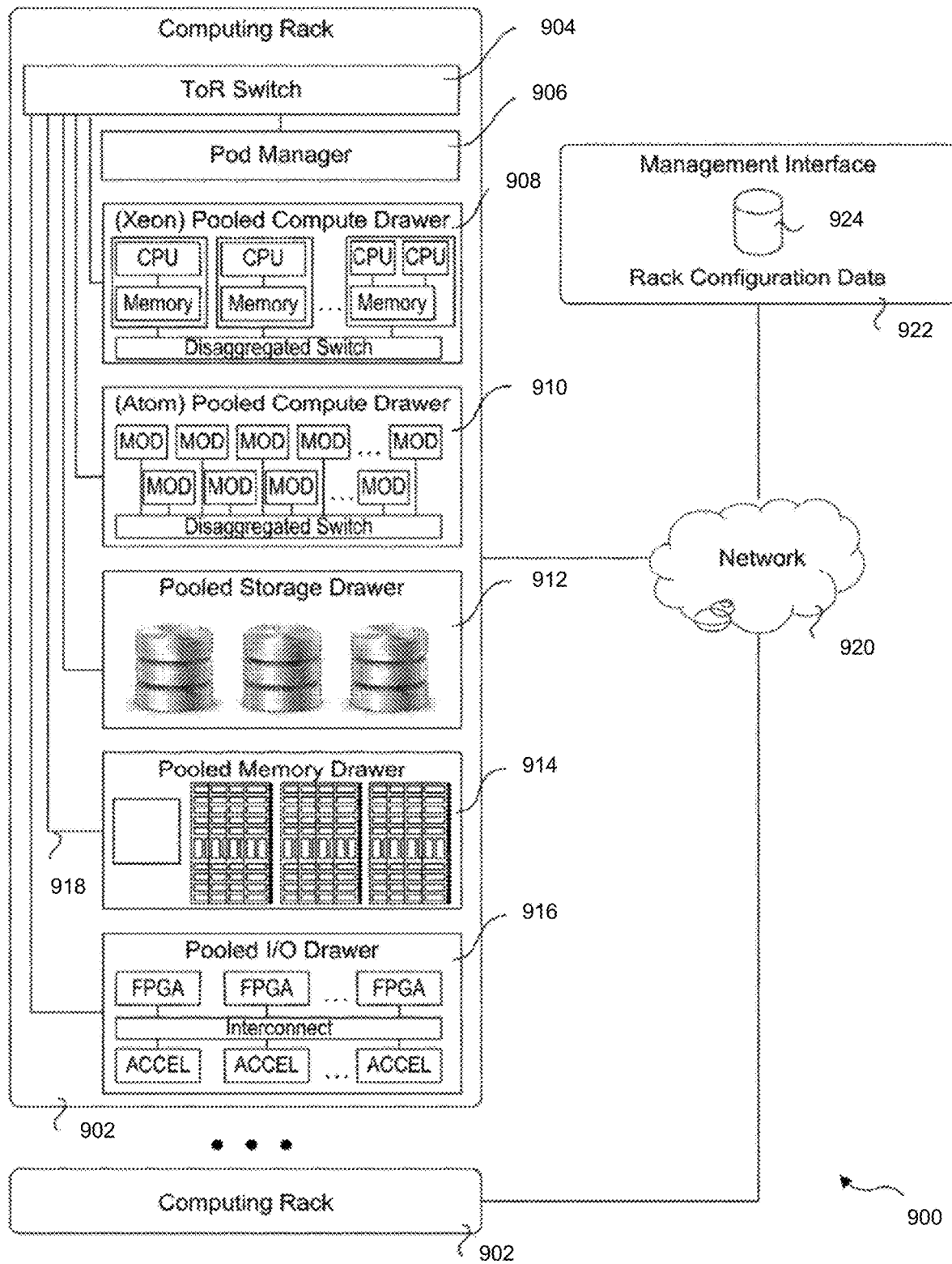
FIG. 9 depicts an environment.

FIG. 9 depicts an environment 900 includes multiple computing racks 902, each including a Top of Rack (ToR) switch 904, a pod manager 906, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 908, and Intel® ATOM™ pooled compute drawer 910, a pooled storage drawer 912, a pooled memory drawer 914, and a pooled I/O drawer 916. Each of the pooled system drawers is connected to ToR switch 904 via a high-speed link 918, such as a 40 Gigabit/second (Gb/s) or 100 Gb/s Ethernet link or a 100+Gb/s Silicon Photonics (SiPh) optical link. In one embodiment high-speed link 918 comprises an 800 Gb/s SiPh optical link.

Multiple of the computing racks 902 may be interconnected via their ToR switches 904 (e.g., to a pod-level switch or data center switch), as illustrated by connections to a network 920. In some embodiments, groups of computing racks 902 are managed as separate pods via pod manager(s) 906. In one embodiment, a single pod manager is used to manage all of the racks in the pod. Alternatively, distributed pod managers may be used for pod management operations.

Environment 900 further includes a management interface 922 that is used to manage various aspects of the environment. This includes managing rack configuration, with corresponding parameters stored as rack configuration data 924.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 10:
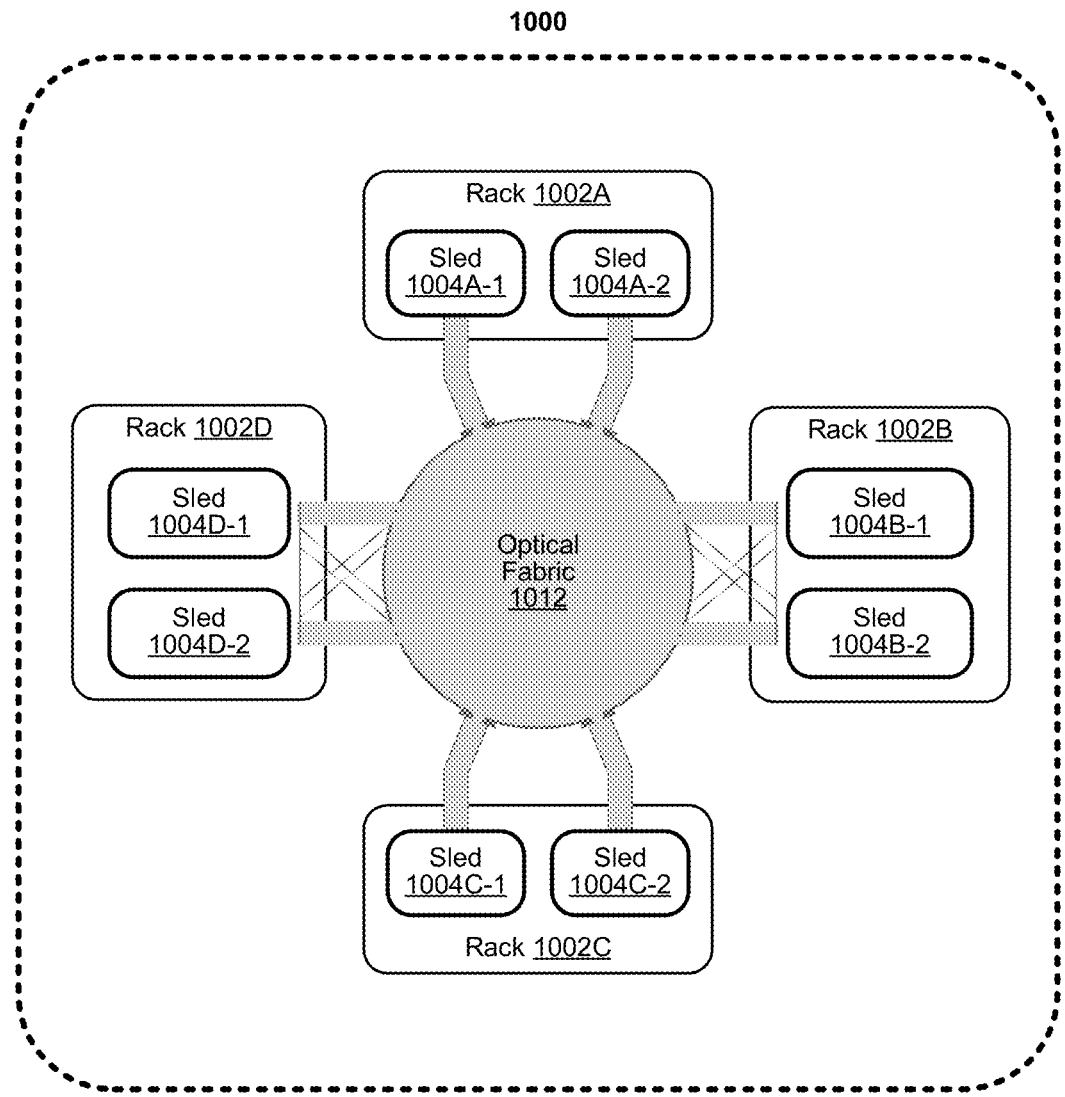
FIG. 10 depicts a data center environment.

FIG. 10 depicts an example of a data center. Various embodiments can be used in or with the data center of FIG. 10 in connection with polling for I/O transactions. As shown in FIG. 10, data center 1000 may include an electrical and/or optical fabric 1012. Optical fabric 1012 may generally include a combination of optical signaling media (such as optical cabling) and optical switching infrastructure via which any particular sled in data center 1000 can send signals to (and receive signals from) each of the other sleds in data center 1000. The signaling connectivity that optical fabric 1012 provides to any given sled may include connectivity both to other sleds in a same rack and sleds in other racks. Data center 1000 includes four racks 1002A to 1002D and racks 1002A to 1002D house respective pairs of sleds 1004A-1 and 1004A-2, 1004B-1 and 1004B-2, 1004C-1 and 1004C-2, and 1004D-1 and 1004D-2. Thus, in this example, data center 1000 includes a total of eight sleds. Optical fabric 1012 can provide each sled signaling connectivity with one or more of the seven other sleds. For example, via optical fabric 1012, sled 1004A-1 in rack 1002A may possess signaling connectivity with sled 1004A-2 in rack 1002A, as well as the six other sleds 1004B-1, 1004B-2, 1004C-1, 1004C-2, 1004D-1, and 1004D-2 that are distributed among the other racks 1002B, 1002C, and 1002D of data center 1000. The embodiments are not limited to this example. For example, fabric 1012 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

An example includes: monitoring core clock cycles spent checking for a presence of input/output (I/O) events and processing I/O events; monitoring core clock cycles spent checking for presence of I/O events; determining core utilization based on clock cycles spent checking for a presence of I/O events and processing I/O events and clock cycles spent checking for presence of I/O events; if core utilization is below a threshold, reducing frequency of the core used to performing polling of I/O events; and if core utilization is at or above the threshold, increasing frequency of the core used to performing polling of I/O events.

What is claimed is:

1. A method used by a storage accelerator for managing central processing unit (CPU) core utilization based on input/output (I/O) workload, the method comprising:
based on clock cycles spent processing I/O events, selectively modifying frequency of a CPU core allocated to polling, wherein the clock cycles spent processing I/O events are based on core clock cycles spent checking for a presence of I/O events and wherein processing I/O events comprises at least one of: completed I/O events and/or uncompleted I/O events.

2. The method of claim 1, wherein the CPU core is associated with a storage accelerator or a network interface.

3. The method of claim 1, comprising a monitor running in user space for determining CPU core utilization based on (i) clock cycles spent checking for a presence of I/O events and processing I/O events and (ii) clock cycles spent checking for presence of I/O events without I/O completion.

4. The method of claim 3, wherein the clock cycles spent checking for a presence of I/O events and processing I/O events comprises time stamp counter accruals for polling for work with completion of I/O events.

5. The method of claim 3, wherein the clock cycles spent checking for presence of I/O events comprises time stamp counter accruals for polling for work without I/O transaction completions.

6. The method of claim 1, wherein selectively modifying is performed within a network interface, storage accelerator, data center, server or rack.

7. An apparatus used by an accelerator to manage central processing unit (CPU) core utilization for input/output (I/O) polling, the apparatus comprising:
a memory device; and
at least one core communicatively coupled to the memory device, the at least one core to:
selectively modify frequency of a CPU core allocated to execute a poller based at least on clock cycles spent processing I/O events, wherein the clock cycles spent processing I/O events are based on core clock cycles spent checking for a presence of I/O events and wherein processing I/O events comprises at least one of: completed I/O events and/or uncompleted I/O events.

8. The apparatus of claim 7, wherein the at least one core is to:
monitor for core utilization based on clock cycles spent checking for a presence of I/O events and processing I/O events.

9. The apparatus of claim 7, wherein the at least one core is to:
monitor for core utilization based on clock cycles spent checking for a presence of I/O events without I/O completion.

10. The apparatus of claim 7, wherein a core of the at least one core is to execute a monitor to determine utilization of the CPU core allocated to execute the poller.

11. The apparatus of claim 7, wherein the poller is to operate in user space.

12. The apparatus of claim 7, comprising: a network interface, storage accelerator, data center, server, or rack.

13. The apparatus of claim 7, wherein the accelerator comprises one or more of: a storage accelerator or a network interface.

14. At least one non-transitory computer-readable medium comprising instructions stored thereon, that if executed by at least one processor of a storage accelerator, cause the at least one processor to:
perform a poller and
selectively modify frequency of a CPU core that performs the poller based at least on clock cycles spent processing I/O events, wherein the clock cycles spent processing I/O events are based on core clock cycles spent checking for a presence of I/O events and wherein processing I/O events comprises at least one of: completed I/O events and/or uncompleted I/O events.

15. The at least one non-transitory computer-readable medium of claim 14, comprising instructions stored thereon, that if executed by at least one processor, cause the at least one processor to:
monitor for core utilization based on clock cycles spent checking for a presence of I/O events and processing I/O events.

16. The at least one non-transitory computer-readable medium of claim 14, comprising instructions stored thereon, that if executed by at least one processor, cause the at least one processor to:
monitor for core utilization based on clock cycles spent checking for presence of I/O events without I/O completion.

17. The at least one non-transitory computer-readable medium of claim 14, comprising instructions stored thereon, that if executed by at least one processor, cause the at least one processor to:
remove a core from polling for I/O events based at least on core clock cycles spent checking for presence of I/O events without I/O completion.

18. The at least one non-transitory computer-readable medium of claim 14, comprising instructions stored thereon, that if executed by at least one processor, cause the at least one processor to:
add a core to poll for I/O events based at least on core clock cycles spent checking for a presence of I/O events and processing I/O events.

* * * * *